(12) United States Patent
Liang et al.

(10) Patent No.: US 9,673,999 B2
(45) Date of Patent: Jun. 6, 2017

(54) MEMBER DEVICE OF STACKED SWITCHES SYSTEM

(71) Applicant: Hewlett Packard Enterprise Development LP, Houston, TX (US)

(72) Inventors: Xuewei Liang, Beijing (CN); Yutao Li, Beijing (CN); Xiaoan Zhang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/786,117

(22) PCT Filed: Jul. 8, 2014

(86) PCT No.: PCT/CN2014/081781
§ 371 (c)(1),
(2) Date: Oct. 21, 2015

(87) PCT Pub. No.: WO2015/003602
PCT Pub. Date: Jan. 15, 2015

(65) Prior Publication Data
US 2016/0204959 A1 Jul. 14, 2016

(30) Foreign Application Priority Data
Jul. 9, 2013 (CN) .......................... 2013 1 0286788

(51) Int. Cl.
*H04L 12/28* (2006.01)
*H04L 12/64* (2006.01)
(Continued)

(52) U.S. Cl.
CPC ........ *H04L 12/6418* (2013.01); *H04L 45/583* (2013.01); *H04L 49/258* (2013.01); *H04L 49/70* (2013.01)

(58) Field of Classification Search
CPC ... H04L 12/6418; H04L 49/258; H04L 49/70; H04L 45/583
(Continued)

(56) References Cited

U.S. PATENT DOCUMENTS 7,120,683 B2   10/2006   Huang et al.
7,170,895 B2   1/2007    Wirth et al.
(Continued)

FOREIGN PATENT DOCUMENTS

CN   1809021 C   7/2006
CN   1809022     7/2006
(Continued)

OTHER PUBLICATIONS

"Features of Cisco Catalyst Switches", Cisco Networking Academy.
(Continued)

*Primary Examiner* — Faisal Choudhury
(74) *Attorney, Agent, or Firm* — Hewlett Packard Enterprise Patent Department

(57) ABSTRACT

A member device of a stacked switches system sends a first received unicast packet via an inter-group stack port which belongs to an aggregated stack link group on a forwarding path towards a different stack group when the first received unicast packet is to be egressed by another member device in the different stack group. The member device is further to send a second received unicast packet via an intra-group stack port on a forwarding path towards another member device in a same stack group when the second received unicast packet which is to be egressed by the another member device in the same stack group. The member device is further to send a third received unicast packet via a data port on the member device which associates with a egress
(Continued)

port identification of the third received unicast packet when the third received unicast packet is to be egressed by the member device.

15 Claims, 7 Drawing Sheets

(51) Int. Cl.
*H04L 12/775* (2013.01)
*H04L 12/931* (2013.01)
*H04L 12/947* (2013.01)

(58) Field of Classification Search
USPC .............................................. 370/395, 395.2
See application file for complete search history.

(56) References Cited

U.S. PATENT DOCUMENTS

| | | |
|---|---|---|
| 8,355,344 B1 | 1/2013 | Lounsberry et al. |
| 8,442,045 B2 | 5/2013 | Subramanian et al. |
| 2011/0299535 A1 | 12/2011 | Vobbilisetty et al. |
| 2012/0039335 A1 | 2/2012 | Subramanian et al. |
| 2012/0134364 A1 | 5/2012 | Coppola et al. |
| 2014/0341080 A1* | 11/2014 | Lin .......................... H04L 45/48 370/256 |
| 2015/0281055 A1* | 10/2015 | Lin ........................ H04L 45/745 370/389 |
| 2015/0288567 A1* | 10/2015 | Lin ..................... H04L 41/0856 370/254 |

FOREIGN PATENT DOCUMENTS

| | | |
|---|---|---|
| CN | 1885810 | 12/2006 |
| CN | 101141404 | 3/2008 |
| CN | 101222410 B | 7/2008 |
| CN | 101345708 | 1/2009 |
| CN | 101861714 B | 10/2010 |
| CN | 102035741 | 4/2011 |
| CN | 103166874 B | 6/2013 |
| WO | WO2013097639 | 7/2013 |

OTHER PUBLICATIONS

International Search Report and Written Opinion dated Oct. 14, 2014, PCT Patent Application No. PCT/CN2014/081781 dated Jul. 8, 2014 (ISA/CN).

* cited by examiner

| unicast forwarding table of the switch 201 | |
|---|---|
| Ports | ID |
| P1 | 4, 5, 6, 7 |
| P2 | 2, 3 |
| G1 | 16, 17, 18, 19, 20, 21, 22, 23, 24, 25, 26, 27, 28, 29, 30, 31 |
| G2 | 8, 9, 10, 11, 12, 13, 14, 15 |

| unicast forwarding table of the switch 202 | |
|---|---|
| Ports | ID |
| P1 | 0, 1, 6, 7 |
| P2 | 4, 5 |
| G1 | 16, 17, 18, 19, 20, 21, 22, 23, 24, 25, 26, 27, 28, 29, 30, 31 |
| G2 | 8, 9, 10, 11, 12, 13, 14, 15 |

| unicast forwarding table of the switch 203 | |
|---|---|
| Ports | ID |
| P1 | 0, 1, 2, 3 |
| P2 | 6, 7 |
| G1 | 16, 17, 18, 19, 20, 21, 22, 23, 24, 25, 26, 27, 28, 29, 30, 31 |
| G2 | 8, 9, 10, 11, 12, 13, 14, 15 |

| unicast forwarding table of the switch 204 | |
|---|---|
| Ports | ID |
| P1 | 2, 3, 4, 5 |
| P2 | 0, 1 |
| G1 | 16, 17, 18, 19, 20, 21, 22, 23, 24, 25, 26, 27, 28, 29, 30, 31 |
| G2 | 8, 9, 10, 11, 12, 13, 14, 15 |

| unicast forwarding table of the switch 205 | |
|---|---|
| Ports | ID |
| P1 | 12, 13, 14, 15 |
| P2 | 10, 11 |
| G1 | 0, 1, 2, 3, 4, 5, 6, 7, 24, 25, 26, 27, 28, 29, 30, 31 |
| G2 | 16, 17, 18, 19, 20, 21, 22, 23 |

| unicast forwarding table of the switch 206 | |
|---|---|
| Ports | ID |
| P1 | 8, 9, 14, 15 |
| P2 | 12, 13 |
| G1 | 0, 1, 2, 3, 4, 5, 6, 7, 24, 25, 26, 27, 28, 29, 30, 31 |
| G2 | 16, 17, 18, 19, 20, 21, 22, 23 |

| unicast forwarding table of the switch 207 | |
|---|---|
| Ports | ID |
| P1 | 8, 9, 10, 11 |
| P2 | 14, 15 |
| G1 | 0, 1, 2, 3, 4, 5, 6, 7, 24, 25, 26, 27, 28, 29, 30, 31 |
| G2 | 16, 17, 18, 19, 20, 21, 22, 23 |

| unicast forwarding table of the switch 208 | |
|---|---|
| Ports | ID |
| P1 | 10, 11, 12, 13 |
| P2 | 8, 9 |
| G1 | 0, 1, 2, 3, 4, 5, 6, 7, 24, 25, 26, 27, 28, 29, 30, 31 |
| G2 | 16, 17, 18, 19, 20, 21, 22, 23 |

| unicast forwarding table of the switch 209 | |
|---|---|
| Ports | ID |
| P1 | 20, 21, 22, 23 |
| P2 | 18, 19 |
| G1 | 0, 1, 2, 3, 4, 5, 6, 7, 8, 9, 10, 11, 12, 13, 14, 15 |
| G2 | 24, 25, 26, 27, 28, 29, 30, 31 |

| unicast forwarding table of the switch 210 | |
|---|---|
| Ports | ID |
| P1 | 16, 17, 22, 23 |
| P2 | 20, 21 |
| G1 | 0, 1, 2, 3, 4, 5, 6, 7, 8, 9, 10, 11, 12, 13, 14, 15 |
| G2 | 24, 25, 26, 27, 28, 29, 30, 31 |

| unicast forwarding table of the switch 211 | |
|---|---|
| Ports | ID |
| P1 | 16, 17, 18, 19 |
| P2 | 22, 23 |
| G1 | 0, 1, 2, 3, 4, 5, 6, 7, 8, 9, 10, 11, 12, 13, 14, 15 |
| G2 | 24, 25, 26, 27, 28, 29, 30, 31 |

| unicast forwarding table of the switch 212 | |
|---|---|
| Ports | ID |
| P1 | 18, 19, 20, 21 |
| P2 | 16, 17 |
| G1 | 0, 1, 2, 3, 4, 5, 6, 7, 8, 9, 10, 11, 12, 13, 14, 15 |
| G2 | 24, 25, 26, 27, 28, 29, 30, 31 |

| unicast forwarding of the switch 213 | |
|---|---|
| Ports | ID |
| P1 | 28, 29, 30, 31 |
| P2 | 26, 27 |
| G1 | 8, 9, 10, 11, 12, 13, 14, 15, 16, 17, 18, 19, 20, 21, 22, 23 |
| G2 | 0, 1, 2, 3, 4, 5, 6, 7 |

| unicast forwarding table of the switch 214 | |
|---|---|
| Ports | ID |
| P1 | 24, 25, 30, 31 |
| P2 | 28, 29 |
| G1 | 8, 9, 10, 11, 12, 13, 14, 15, 16, 17, 18, 19, 20, 21, 22, 23 |
| G2 | 0, 1, 2, 3, 4, 5, 6, 7 |

| unicast forwarding table of the switch 215 | |
|---|---|
| Ports | ID |
| P1 | 24, 25, 26, 27 |
| P2 | 30, 31 |
| G1 | 8, 9, 10, 11, 12, 13, 14, 15, 16, 17, 18, 19, 20, 21, 22, 23 |
| G2 | 0, 1, 2, 3, 4, 5, 6, 7 |

| unicast forwarding table of the switch 216 | |
|---|---|
| Ports | ID |
| P1 | 26, 27, 28, 29 |
| P2 | 24, 25 |
| G1 | 8, 9, 10, 11, 12, 13, 14, 15, 16, 17, 18, 19, 20, 21, 22, 23 |
| G2 | 0, 1, 2, 3, 4, 5, 6, 7 |

FIG. 3

| unicast forwarding table of the switch 401 ||
|---|---|
| Ports | ID |
| P1 | NULL |
| P2 | 2,3,4,5 |
| G1 | NULL |
| G2 | 6,7,8,9,10,11,12, 13,14,15,16,17 |

| unicast forwarding table of the switch 402 ||
|---|---|
| Ports | ID |
| P1 | 0,1 |
| P2 | 4,5 |
| G1 | NULL |
| G2 | 6,7,8,9,10,11,12, 13,14,15,16,17 |

| unicast forwarding table of the switch 403 ||
|---|---|
| Ports | ID |
| P1 | 0,1,2,3 |
| P2 | NULL |
| G1 | NULL |
| G2 | 6,7,8,9,10,11,12, 13,14,15,16,17 |

| unicast forwarding table of the switch 404 ||
|---|---|
| Ports | ID |
| P1 | NULL |
| P2 | 8,9,10,11 |
| G1 | 0,1,2,3, 4,5, |
| G2 | 12,13,14,15,16,17 |

| unicast forwarding table of the switch 405 ||
|---|---|
| Ports | ID |
| P1 | 6,7 |
| P2 | 10,11 |
| G1 | 0,1,2,3, 4,5, |
| G2 | 12,13,14,15,16,17 |

| unicast forwarding table of the switch 406 ||
|---|---|
| Ports | ID |
| P1 | 6,7,8,9 |
| P2 | NULL |
| G1 | 0,1,2,3, 4,5, |
| G2 | 12,13,14,15,16,17 |

| unicast forwarding table of the switch 407 ||
|---|---|
| Ports | ID |
| P1 | NULL |
| P2 | 14,15,16,17 |
| G1 | 6,7,8,9,10,11 |
| G2 | NULL |

| unicast forwarding table of the switch 408 ||
|---|---|
| Ports | ID |
| P1 | 12,13 |
| P2 | 16,17 |
| G1 | 6,7,8,9,10,11 |
| G2 | NULL |

| unicast forwarding table of the switch 409 ||
|---|---|
| Ports | ID |
| P1 | 12,13,14,15 |
| P2 | NULL |
| G1 | 6,7,8,9,10,11 |
| G2 | NULL |

FIG. 5 unicast forwarding table of the switch 601

| Ports | ID |
|---|---|
| P1 | 2,3 |
| P2 | NULL |
| G1 | 4,5,6,7 |
| G2 | NULL | unicast forwarding table of the switch 602

| Ports | ID |
|---|---|
| P1 | 0,1 |
| P2 | NULL |
| G1 | 4,5,6,7 |
| G2 | NULL | unicast forwarding table of the switch 603

| Ports | ID |
|---|---|
| P1 | 6,7 |
| P2 | NULL |
| G1 | 0,1,2,3 |
| G2 | NULL | unicast forwarding table of the switch 604

| Ports | ID |
|---|---|
| P1 | 4,5 |
| P2 | NULL |
| G1 | 0,1,2,3 |
| G2 | NULL |

MEMBER DEVICE OF STACKED SWITCHES SYSTEM

CLAIM FOR PRIORITY

The present application is a national stage filing under 35 U.S.C 371 of PCT application No. PCT/CN2014/081781, having an international filing date Jul. 8, 2014, which claims the benefit of priority from Chinese Patent Application, No. 201310286788.2, having a filing date of Jul. 9, 2013, the disclosures of which are hereby incorporated by reference in their entireties.

BACKGROUND

Stack refers to combining more than one switching devices to work together, so as to provide more ports in a limited space. Multiple switching devices supporting the stack may be connected with each other to form a virtual device. The virtual device may be referred to as a stacked switches system. Each switching device included in the stacked switches system may be referred to as a member device.

BRIEF DESCRIPTION OF THE DRAWINGS

Features of the present disclosure are illustrated by way of example and not limited in the following figure(s), in which like numerals indicate like elements, in which:

FIG. 3 is a schematic diagram illustrating unicast forwarding information of each switch in the stacked switches system as shown in FIG. 2;

FIG. 5 is a schematic diagram illustrating unicast forwarding information of each switch in the stacked switches system as shown in FIG. 4;

DETAILED DESCRIPTION

Hereinafter, the present disclosure is described in further detail with reference to the accompanying drawings and examples.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

In the example of the present disclosure, the switches in the stack group of the stacked switches system may be connected in a same or different manner with that of stack groups of the stacked switches system. That is, if the switches in the stack group are connected in a ring, the stack groups may be connected in a ring or in a chain. Or in another implementation, if the switches in the stack group are connected in a chain, the stack groups may be connected in a ring or in a chain.

Figure 1:
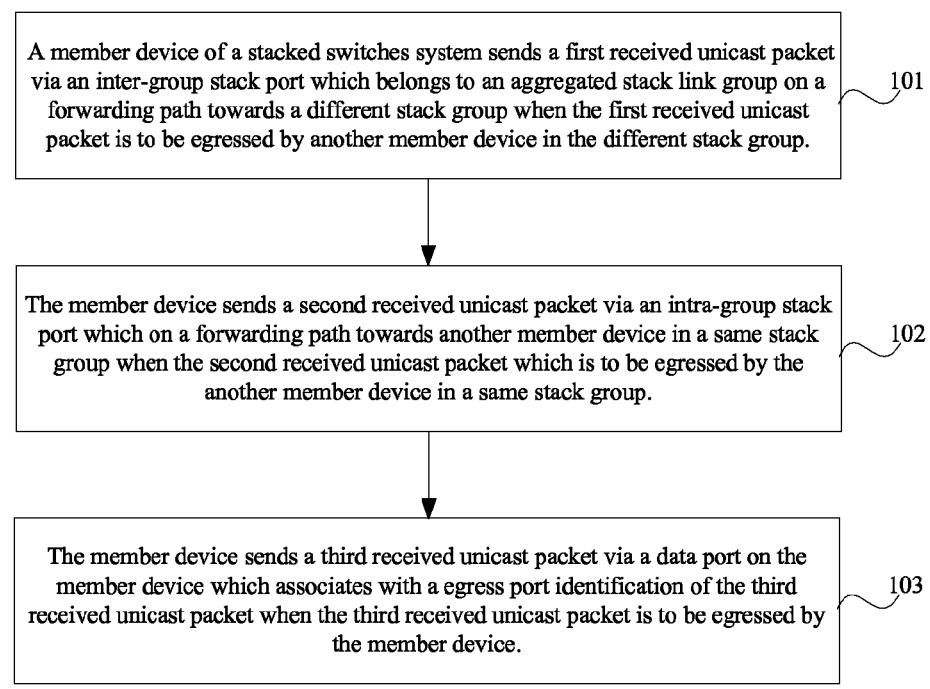
FIG. 1 is a flowchart illustrating a method for unicast packet forwarding based on an example of the present disclosure.

FIG. 1 is a flowchart illustrating a method of unicast packet forwarding method based on an example of the present disclosure. A stacked switches system may include at least two stack groups and a plurality of member devices, in which the number of the member devices is greater than the number of the stack groups. Intra-group stack ports of the member devices in a same stack group may be connected to each other via stack links to form a physical ring or chain topology. Inter-group stack ports of the member devices in a same stack group may be connected to inter-group stack ports of member devices in an adjacent stack group via stack links. The member devices in the same stack group may associate their inter-group stack ports connecting to member switches in the adjacent stack group with an aggregated stack link group. As shown in FIG. 1, the method may include following operations.

At block 101, a member device sends a first received unicast packet via an inter-group stack port which belongs to an aggregated stack link group on a forwarding path towards a different stack group when the first received unicast packet is to be egressed by another member device in the different stack group.

At block 102, the member device may send a second received unicast packet via an intra-group stack port which on a forwarding path towards another member device in a same stack group when the second received unicast packet which is to be egressed by the another member device in the same stack group At block 103, the member device may send a third received unicast packet via a data port on the member device which associates with a egress port identification of the third received unicast packet when the third received unicast packet is to be egressed by the member device.

A First Example

Figure 2:
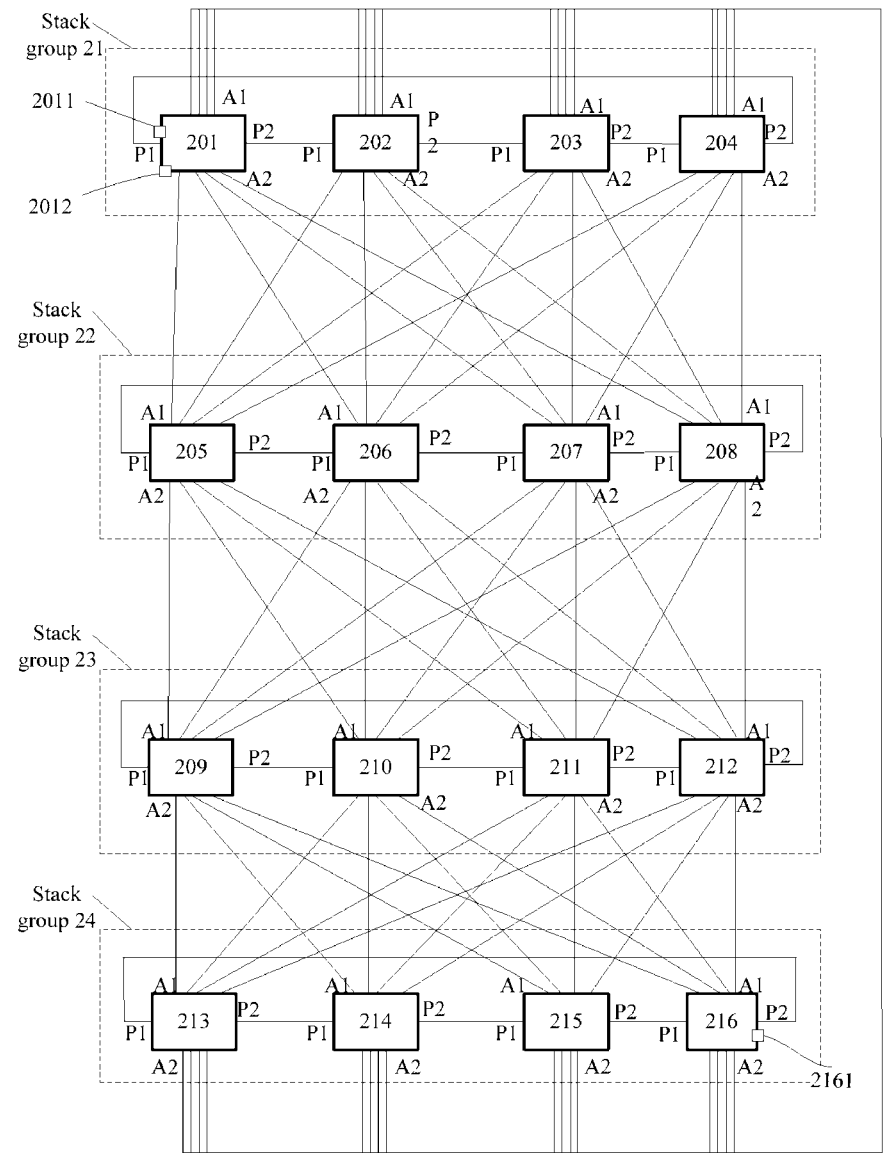
FIG. 2 is a schematic diagram illustrating an application of a stacked switches system based on an example of the present disclosure.

FIG. 2 is a schematic diagram illustrating an application of a stacked switches system based on an example of the present disclosure. As shown in FIG. 2, the stacked switches system includes four stack groups, stack group 21 to stack group 24. Each switch in the stack groups 21 to 24 is configured with a valid intra-group stack port P1 and a valid intra-group stack port P2. In each stack group, switches are adjacent to each other when their different types of valid intra-group stack ports P1 and P2 are connected.

In the stack group 21, switch 201 is adjacent to switch 202, the switch 202 is adjacent to switch 203, the switch 203 is adjacent to switch 204 and the switch 204 is adjacent to the switch 201. Thus, the intra-group stack port P2 of the switch 201 is connected with the intra-group stack port P1 of the switch 202 via a stack link. The intra-group stack port P2 of the switch 202 is connected with the intra-group stack port P1 of the switch 203 via a stack link. The intra-group stack port P2 of the switch 203 is connected with the intra-group stack port P1 of the switch 204 via a stack link. The intra-group stack port P2 of the switch 204 is connected with the intra-group stack port P1 of the switch 201 via a stack link. Thus, the switches 201~204 are connected with each other to form the stack group 21 with the ring topology by using stack links.

Based on the same mode, switches 205~208 are connected with each other to form the stack group 22 with the ring topology by using stack links; switches 209~212 are connected with each other to form the stack group 23 with the ring topology by using stack links; switches 213~216 are connected with each other to form the stack group 24 with the ring topology by using stack links.

Stack groups are adjacent to each other when their member devices are connected with stack links. Each switch of the four stack groups is configured with a valid inter-group stack port A1 and a valid inter-group stack port A2. The stack group 21 and the stack group 24 are adjacent stack groups. The stack group 21 and the stack group 22 are adjacent stack groups. The stack group 22 and the stack group 23 are adjacent stack groups. The stack group 23 and the stack group 24 are adjacent stack groups. Four inter-group stack ports A1 of the switch 201 are respectively connected with an inter-group stack port A2 of the switch 213, an inter-group stack port A2 of the switch 214, an inter-group stack port A2 of the switch 215 and an inter-group stack port A2 of the switch 216 via stack links. The four inter-group stack ports A2 of the switch 201 are respectively connected with an inter-group stack port A1 of the switch 205, an inter-group stack port A1 of the switch 206, an inter-group stack port A1 of the switch 207 and an inter-group stack port A1 of the switch 208 via stack links.

Based on the same mode, the inter-group stack ports A1 of the switches 202~204 are respectively connected with the inter-group stack ports A2 of the switches 213~216; the inter-group stack ports A2 of the switches 202~204 are respectively connected with and the inter-group stack ports A1 of the switches 205~208; the inter-group stack ports A2 of the switches 205~208 are connected with the inter-group stack ports A1 of the switches 209~212; the inter-group stack ports A2 of the switches 209~212 are connected with the inter-group stack ports A1 of the switches 213~216.

When the switches 201~216 in stacked switches system as shown in FIG. 2 complete topology convergence, the switches 201~204 may respectively associate their inter-group stack ports A1 in a working state to a first aggregated stack link group G1 of the stack group 21, the switches 201~204 may respectively associate their inter-group stack ports A2 in a working state to a second aggregated stack link group G2 of the stack group 21. Based on the same mode, each switch in the stack groups 22 to 24 may associate its working inter-group stack ports A1 and A2 to a first aggregated stack link group G1 and a second aggregated stack link group G2 of its stack group.

In an example, each switch in the stacked switches system may be associated with a unique identification (ID). Or in another implementation, each forwarding chip of each switch is associated with an exclusive identification, it is assumed that each switch shown in FIG. 2 is configured with two forwarding chips. The member IDs of the switches 201 to 216 are respectively slot 1 to slot 16. The IDs associate with the forwarding chips of the switches 201-216 in FIG. 2 are shown in table 1.

TABLE 1

| | Slot ID | | | | | | | | | | | | | | |
|---|---|---|---|---|---|---|---|---|---|---|---|---|---|---|---|
| | Slot 1 | Slot 2 | Slot 3 | Slot 4 | Slot 5 | Slot 6 | Slot 7 | Slot 8 | Slot 9 | Slot 10 | Slot 11 | Slot 12 | Slot 13 | Slot 14 | Slot 15 | Slot 16 |
| Associated ID | 0, 1 | 2, 3 | 4, 5 | 6, 7 | 8, 9 | 10, 11 | 12, 13 | 14, 15 | 16, 17 | 18, 19 | 20, 21 | 22, 23 | 24, 25 | 26, 27 | 28, 29 | 30, 31 |

FIG. 3 shows a unicast forwarding table of each switch in the stacked switches system based on an example of the present disclosure. Hereinafter, forwarding procedure of a unicast packet in the stacked switches system is described with reference to FIG. 2 and FIG. 3.

The switch 201 may receive a unicast packet via a data port 2011 belonging to VLAN 10. In the received unicast packet, VLAN ID is VLAN 10, a source MAC address is MAC 1 and a destination MAC address is MAC 2. The data port 201 is ingress port of the received unicast packet, and the chip which the data port 2011 locates on is ingress chip of the received unicast packet.

Port identification 2011 of the data port 2011 is ingress port identification of the received unicast packet, and chip ID 0 associating with the ingress chip is ingress chip identification of the received unicast packet, may represent ingress device of the received unicast packet.

The switch 201 may look up a local MAC address table based on the VLAN 10 and MAC 1 of the received unicast packet, and learn an entry based on the VLAN 10, the MAC 1, the chip ID 0 and the port identification 2011 when no matching MAC address entry is found based on the VLAN 10 and the MAC 1. In the newly learnt entry, the VLAN 10 and the MAC 1 may associate with the port identification 2011 and the chip ID 0.

The switch 201 may look up the local MAC address table based on the VLAN 10 and the MAC 2 of the received unicast packet, and find a matching MAC address entry in which the VLAN 10 and the MAC 2 may associate with chip ID 1 and port identification 2012, i.e., the chip ID 1 is egress chip identification and the port identification 2012 is egress port identification. The chip ID 1 may represent egress device of the received unicast packet.

The switch 201 may identify that ID 1 is a chip identification associate with a local chip on the switch 201, and transmit the received unicast packet via data port 2012 corresponding to the egress port identification 2012.

The switch 201 may receive another unicast packet via the data port 2011, wherein the VLAN ID is VLAN ID 10, a source MAC address is the MAC 1 and a destination MAC address is MAC 3.

The switch 201 may look up the local MAC forwarding table based on the VLAN 10 and the MAC 1, and find the matching entry. The switch 201 may look up the local MAC address forwarding table based on the VLAN 10 and the MAC 3, and find a matching MAC address entry in which the VLAN 10 and the MAC 3 may associate with chip ID 30 and port identification 2161.

The switch 201 may identify that the chip ID 30 is not a chip identification associate with a local chip, look up the chip ID 30 in the unicast forwarding table of the switch 201 as shown in FIG. 3, and find the aggregated stack link group G1 associated with the chip ID 30. The switch 201 may forward the unicast packet containing the ingress chip identification ID 0, ingress port identification 2011, egress chip identification ID 30 and the egress port identification 2161 to the stack group 24 via the aggregated stack link group G1 of the stack group 24. In one example, the switch 201 may select one of the inter-group stack ports A1 on the switch 201 from the aggregated stack link group G1 of the stack group 21 and forward the unicast packet containing the ingress chip identification ID 0, ingress port identification 2011, egress chip identification ID 30 and egress port identification 2161 via the selected inter-group stack port A1. In one example, the inter-group stack port A1 selected by the switch 201 is connected with the inter-group stack port A2 of the switch 213 via a stack link, the unicast packet containing the ingress chip identification ID 0, ingress port identification 2011, egress chip identification ID 30 and egress port identification 2161 is forwarded to the switch 213 in the adjacent stack group 24.

The switch 213 may receive the unicast packet containing the ingress chip identification ID 0, ingress port identification 2011, egress chip identification ID 30 and egress port identification 2161. The switch 213 may look up a local MAC address forwarding table based on the VLAN 10 and the MAC 1, and learn a new a MAC address entry based on the VLAN 10, MAC 1, the ingress chip identification ID 0 and the ingress port identification 2011 when no matching MAC address entry is found.

The switch 213 may identify that the egress chip identification ID 30 is neither ID 24 nor ID 25 which are associate with local chips on the switch 213, look up a unicast forwarding table of the switch 213 as shown in FIG. 3 based on the egress chip identification ID 30, and find an intra-group stack port P1. The switch 213 may transmit the unicast packet containing the ingress chip identification ID 0, ingress port identification 2011, egress chip identification ID 30 and egress port identification 2161 to the switch 216 via the found intra-group stack port P1.

The switch 216 may receive the unicast packet containing the ingress chip identification ID 0, ingress port identification 2011, egress chip identification ID 30 and egress port identification 2161. The switch 216 may look up a local MAC address forwarding table based on the VLAN 10 and the MAC 1, and learn a new a MAC address entry based on the VLAN 10, the MAC 1, the ingress chip identification ID 0 and the ingress port identification 2011 when no matching MAC address entry is found.

The switch 216 may identify that the egress chip identification ID 30 may be associated with one of local chips on the switch 216, remove the ingress chip identification ID 0, ingress port identification 2011, egress chip identification ID 30 and egress port identification 2161, and transmit the unicast packet via a data port 2161 corresponding to the egress port identification 2161.

The switch 201 may firstly forward the received unicast packet via the aggregated stack link group G1 of the stack group 21 which on a forwarding path towards the stack group 24 to which the switch 216 belongs. Due to the inter-group stack port selected from the aggregated stack link group G1 of the stack group 21 connects the switch 213 in the stack group 24. The unicast packet is forwarded from the switch 201 to the switch 213. The switch 213 may forward the received unicast packet via the intra-group stack port on a forwarding path towards the switch 216 in the same stack group 21. Then, the received unicast packet is forwarded from the switch 213 to the switch 216. Finally, the switch 216 may forward the received unicast packet to a destination receiving end.

In FIG. 3, the unicast forwarding table of each switch records: relationships between chip IDs of other switches in the same stack group and intra-group stack ports on forwarding paths towards each of other switches in the same stack group, and relationships between chip IDs of switches in other stack groups and aggregated stack link groups on forwarding paths towards each of other stack groups.

In the stacked switches system as shown in FIG. 2, there are two paths from each switch to any other switch in the same stack group. Only one of the two paths may be selected as a forwarding path based on a shortest path principle. If the two paths have the same number of hops, the path passing the preferable intra-group stack port is selected as the forwarding path. In FIG. 2, the stack ports P1 of the switches 201~216 are preferable stack ports.

In the stacked switches system as shown in FIG. 2, there are two paths from one stack group to another stack group. One of the two paths is selected as a forwarding path based on the shortest path first principle. Thus, unicast packets entered from the switches of each stack group may be forwarded to another stack group via a shortest path. If the two paths between every two stack groups have the same number of hops, the path passing the preferable aggregated stack link group is selected as the forwarding path. In FIG. 2, aggregated stack link groups G1 of stack group 21~24 are preferable aggregated stack link group.

Based on the above principles, forwarding paths from one switch to other the switches in the same stack group as well as forwarding paths from one stack group to other stack groups may be determined. Based on these forwarding paths, the intra-group stack ports on forwarding paths towards other switches in a same stack group and the aggregated stack link group on forwarding paths towards other stack group can be determined according to these forwarding paths, and then unicast forwarding table of each switch can be configured accordingly.

Hereinafter, the configuration of the unicast forwarding table of the switch 201 is taken as an example. The unicast forwarding tables of other switches in the stacked switches system may be configured based on the same mode.

In the unicast forwarding table of the switch 201, the intra-group stack port P1 corresponds to chip ID 4~ID 7 (as shown in FIG. 3).

Suppose that a unicast packet received at the switch 201 may associate with egress chip identification ID 4 or ID 5 which are chip IDs associate with the switch 203. The switch 201 and the switch 203 are in the same stack group 21. There are two paths from the switch 201 to the switch 203: one path is the switch 201->the switch 204->the switch 203, and another path is the switch 201->the switch 202->the switch 203. These two paths between the switch 201 and 202 have the same number of hops, i.e., 2 hops. The preferable intra-group stack port P1 of the switch 201 is on the former path, the former path is selected as the forwarding path from the switch 201 to the switch 203. Therefore, in the unicast forwarding table of the switch 201, the chip IDs correspond to the intra-group stack port P1 include ID 4~ID 5.

Suppose that a unicast packet received at the switch 201 associates with an egress chip identification ID 6 or ID 7 which are chip IDs associate with the switch 204. The switch 201 and the switch 204 are in the same stack group 21. There are two paths from the switch 201 to the switch 204: on path is the switch 201->the switch 204, and another path is the switch 201->the switch 202->the switch 203->the switch 204. The number of hops of the former path is less than the number of hops of the latter path. Thus, the former path is selected as the forwarding path from the switch 201 to the switch 204. Therefore, in the unicast forwarding table of the switch 201, the chip IDs correspond to the intra-group stack port P1 include ID 6~ID 7.

In the unicast forwarding table of the switch 201, the chip IDs correspond to the stack port P2 include ID 2~ID 3 (as shown in FIG. 3).

Suppose that a unicast packet received at the switch 201 associates with egress chip identification ID 2 or ID 3 which are chip IDs associate with the switch 202. The switch 201 and the switch 202 are in the same stack group. There are two paths from the switch 201 to the switch 202: one path is the switch 201->the switch 204->the switch 203->the switch 202, and another path is the switch 201->the switch 202. The number of hops of the latter path is less. Thus, the latter path is selected as the forwarding path from the switch 201 to the switch 202. Therefore, in the unicast forwarding table of the switch 201, the chip IDs correspond to the intra-group stack port P2 include ID 2~ID 3.

In the unicast forwarding table of the switch 201, the chip IDs correspond to the aggregated stack link group G1 include ID 16~ID 23 and ID 24~ID 31 (as shown in FIG. 3).

Suppose that a unicast packet received at the switch 201 associates with any of egress chip identifications ID 16~ID 23 which are chip IDs associate with switches in the stack group 23. There are two paths from the stack group 21 to the stack group 23: one path is stack group 21->stack group 24->stack group 23, another path is stack group 21 ->stack group 22->stack group 23. These two paths between the stack groups 21 and 23 have the same number of hops, i.e., two hops. The preferable aggregated stack link group G1 of the stack group 21 is on the former path. Thus, the former path is selected as the forwarding path from the stack group 21 to the stack group 23. Therefore, in the unicast forwarding table of the switch 201, the chip IDs correspond to the aggregated stack link group G1 include ID 16~ID 23.

Suppose that a unicast packet received at the switch 201 associates with any of the egress chip identifications ID 24~ID 31 which associate with switches in the stack group 24. There are two paths from the stack group 21 to the stack group 24: one path is stack group 21->stack group 24, and another path is stack group 21->stack group 22->stack group 23->stack group 24. The latter path of which number of hops is less is selected as the forwarding path from the stack group 21 to the stack group 24. Therefore, in the unicast forwarding table of the switch 201, the chip IDs correspond to the aggregated stack link group G1 include ID 24~ID 31.

In the unicast forwarding table of the switch 201, the chip IDs correspond to the aggregated stack link group G2 include ID 8~ID 15 (see 304 in FIG. 3).

Suppose that a unicast packet received at the switch 201 associates with any of the egress chip identifications ID 8~ID 15 associating with switches in the stack group 22. There are two paths from the stack group 21 to the stack group 22: one path is stack group 21->stack group 24->stack group 23->stack group 22, and another path is stack group 21->stack group 22. The latter path of which the number of hops is less is selected as the forwarding path from the stack group 21 to the stack group 22. Therefore, in the unicast forwarding table of the switch 201, the chip IDs correspond to the aggregated stack link group G2 include ID 8~ID 15.

In the stack group 21, the unicast forwarding tables of the switches 202~204 are configured in the same principle of configuring the unicast forwarding table of the switch 201.

According to the same principle of configuring the unicast forwarding tables of the switches in the stack group 21, the unicast forwarding tables of each switch in the stack group 22~stack group 24 may be configured.

The unicast forwarding tables of the switches 201~216 may be configured manually, or be configured automatically by executing a computer program.

A Second Example

Figure 4:
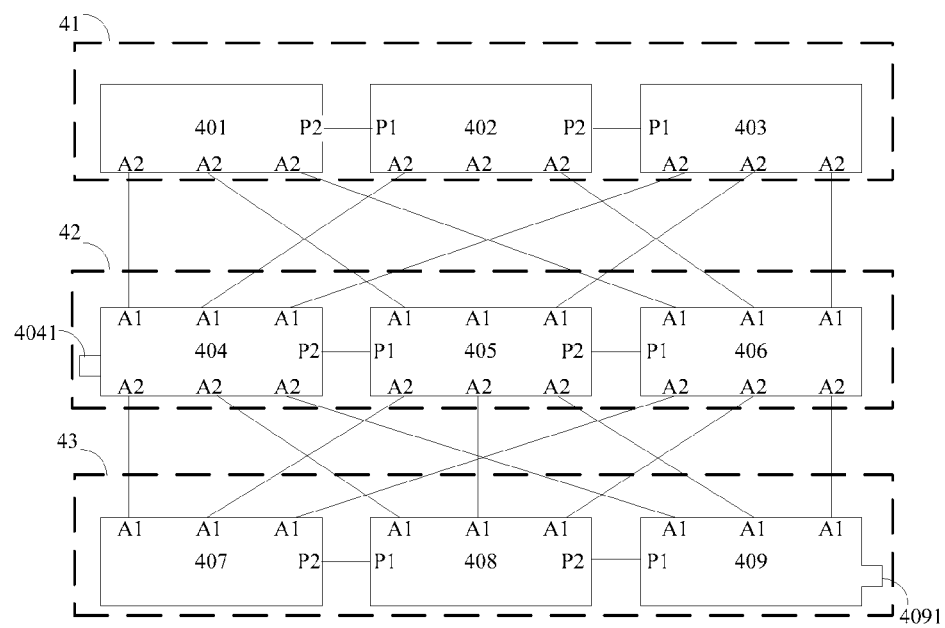
FIG. 4 is a schematic diagram illustrating another stacked switches system based on an example of the present disclosure.

FIG. 4 shows a stacked switches system including stack group 41~stack group 43. In the stack group 1, an intra-group stack port P2 of switch 401 is connected with an intra-group stack port P1 of switch 402 via a stack link. An intra-group stack port P2 of the switch 402 is connected with an intra-group stack port P1 of switch 403 via a stack link. Switches 401~403 are connected with each other to form the stack group 21 with a chain topology. Based on the same mode, switches 404~406 are connected with each other to form the stack group 42. Switches 407~409 are connected with each other to form the stack group 43.

The stack group 41 and stack group 42 are adjacent stack groups. The stack group 42 and stack group 43 are adjacent stack groups. Inter-group stack ports A2 of the switches 401~403 are respectively connected with inter-group stack ports A1 of the switches 404~406 via stack links. The inter-group stack ports A2 of switches 404~406 of stack group 42 are connected with the inter-group stack port A1 of switches 407~409 via stack links. The switches in the three stack groups are connected in turn in a chain to form the stacked switches system.

When the switches 401~409 in the stacked switches system as shown in FIG. 4 complete topology convergence. Switches 401~403 associate their working inter-group stack ports A2 to a second aggregated stack link group G2 of the stack group 41. Switches 404~406 associate their working inter-group stack ports A1 and A2 respectively to a first aggregated stack link group G1 and a second aggregated stack link group G2 of the stack group 42. Switches 407~409 associate their working inter-group stack ports A1 to a first aggregated stack link group G1 of the stack group 43.

In an example, each forwarding chip of each switch is associated with an exclusive identification, it is assumed that each switch shown in FIG. 4 is configured with two forwarding chips. The member IDs of the switches 401 to 409 are respectively slot 1 to slot 9. The IDs associate with the forwarding chips of the switches in FIG. 4 are as shown in table 2.

TABLE 2

| | Slot ID | | | | | | | | |
|---|---|---|---|---|---|---|---|---|---|
| | Slot 1 | Slot 2 | Slot 3 | Slot 4 | Slot 5 | Slot 6 | Slot 7 | Slot 8 | Slot 9 |
| Associated ID | 0, 1 | 2, 3 | 4, 5 | 6, 7 | 8, 9 | 10, 11 | 12, 13 | 14, 15 | 16, 17 |

FIG. 5 shows a unicast forwarding table of each switch in the stacked switches system based on an example of the present disclosure. Hereinafter, the unicast packet forwarding process in the stacked switches system is described with reference to FIG. 4 and FIG. 5.

The switch 404 may receive a unicast packet via a data port 404 belonging to VLAN 20. In the received unicast packet, VLAN ID is VLAN 20, a source MAC address is MAC 4 and a destination MAC address is MAC 5. The data port 4041 is ingress port of the received unicast packet, and the chip which the data port 4041 locates on is an ingress chip of the received unicast packet. Port identification 4041 of the data port 404 in ingress port identification, and chip ID 7 of the ingress chip is ingress chip identification.

The switch 404 may look up a local MAC address forwarding table based on the VLAN 20 and MAC 4 of the received unicast packet, and learn a new MAC address entry based on the VLAN 20, the MAC 4, the chip identification ID 7 and the port identification 4041 when no matching MAC address entry is found. The switch 404 may look up the local MAC address table based on the VLAN 20 and the MAC 5, and find a matching MAC address entry in which the VLAN 20 and the MAC 5 associate with chip ID 16 and port identification 4091, i.e., egress chip identification and egress port identification of the received unicast packet are respectively chip ID 16 and Port identification 4091.

The switch 404 may identify that ID 16 is neither chip ID 6 nor chip ID which associate with local chips on the switch 404.

The switch 404 may look up the unicast forwarding table of the switch 404 as shown in FIG. 5, and find the aggregated stack link group G2 associate with the chip ID 16 in the unicast forwarding table of the switch 404 as shown in FIG. 5. The switch 404 forward the unicast packet containing the ingress chip ID 7, the ingress port identification 4041, the egress chip ID 16 and the egress port identification 4091 to the stack group 43. In one example, the switch 404 may select one of the inter-group stack port A2 on the switch 404 from the aggregated stack link group G2 of the stack group 41, and forward the unicast packet containing the ingress chip identification ID 7, the ingress port identification 4041, the egress chip identification ID 16 and the egress port identification 4091 via the selected inter-group stack port A2. In one example, the selected inter-group stack port A2 on the switch 404 is connected with the inter-group stack port A1 of the switch 407, the unicast packet containing the ingress chip identification ID 7, the ingress port identification 4041, the egress chip identification ID 16 and egress port identification 4091 is forwarded to the switch 407.

The switch 407 may receive the unicast packet containing the ingress chip identification ID 7, ingress port identification 4041, egress chip identification ID 16 and egress port identification 4091. The switch 407 may find a matching MAC address entry by looking up a local MAC address forwarding table based on the VLAN ID 20 and the MAC 4, identify that the egress chip identification ID 16 is neither ID 12 nor ID 13 which are associate with local chips on the switch 407, and find an intra-group stack port P2 by looking up the unicast forwarding table of the switch 407 as shown in FIG. 5 based on the egress chip identification ID 16. The switch 407 may forward the unicast packet containing the ingress chip identification ID 7, ingress port identification 4041, egress chip identification ID 16 and egress port identification 4091 to the switch 408 via the founded intra-group stack port P2.

The switch 408 may receive the unicast packet containing the ingress chip identification ID 7, ingress port identification 4041, egress chip identification ID 16 and egress port identification 4091, and find a matching MAC address entry by looking up a local MAC address forwarding table based on the VLAN 20 and the MAC 4. The switch 408 may identify that the egress chip identification ID 16 is neither ID 14 nor ID 15 which are associate with local chips on the switch 408, and find an intra-group stack port P2 by looking up the unicast forwarding table of the switch 408 as shown in FIG. 5 based on the egress chip identification ID 16. The switch 408 may forward the unicast packet containing the ingress chip identification ID 7, ingress port identification 4041, egress chip identification ID 16 and egress port identification 4091 to the switch 409 via the intra-group stack port P2.

The switch 409 may receive the unicast packet containing the ingress chip identification ID 7, ingress port identification 4041, egress chip identification ID 16 and egress port identification 4091, and find a matching MAC address entry by looking up a local MAC address forwarding table based on the VLAN 20 and the MAC 4. The switch 409 may identify that the egress chip identification ID 16 may be associated with a local chip on the switch 409, may forward the unicast packet via a data port 409 corresponding to the egress port identification 4091 by removing the ingress chip identification ID 7, ingress port identification 4041, egress chip identification ID 16 and egress port identification 4091.

The switch 404 may ingress the unicast packet into the stacked switches system, forward the unicast packet through the aggregated stack link group G2 of the stack group 42 which is on the forwarding path from the stack group 41 to the stack group 42. Due to the inter-group stack port selected from the aggregated stack link group G2 of the stack group 42 connects the switch 407 in the stack group 43. The unicast packet is forwarded from the switch 404 to the switch 407. Then the switches 407 and 408 may respectively forward the unicast packet via their intra-group stack port P2 on forwarding paths towards the switch 409 in the same stack group 43. Finally, the switch 409 may forward the unicast packet to a destination receiving end.

In FIG. 5, the unicast forwarding table of each switch records: relationships between chip IDs of other switches in the same stack group and intra-group stack ports on forwarding paths towards each of other switches in the same stack group, and relationships between chip IDs of switches in other stack groups and aggregated stack link groups on forwarding paths towards each of other stack groups.

In the stacked switches system as shown in FIG. 4, the switches in each stack group are connected with each other in a chain topology, there is only one path from each switch to any other switch in the same stack group. For the stack groups 41-43, there is one path from one stack group to another stack group.

The forwarding paths from each switch to any other switch in the same stack group may be determined. The forwarding paths from each stack group to other stack groups may also be determined. Based on these forwarding paths, the intra-group stack ports or aggregated stack link groups on these forwarding paths are recorded in the unicast forwarding table for forwarding.

Hereinafter, the configuration of the unicast forwarding table of the switch 401 is taken as an example. The principle of configuring unicast forwarding tables of other switches is same.

The intra-group stack port P1 of the switch 401 is invalid, thus in the unicast forwarding table of the switch 401, the chip IDs corresponding to the stack port P1 is null.

The intra-group stack port P2 of the switch 401 is respectively on the forwarding path from the switch 401 to the switch 402 and the forwarding path from the switch 401 to the switch 403. Therefore, in the unicast forwarding table of the switch 401, the chip IDs corresponding to the intra-group stack port P2 include ID 2~ID 3 and ID 4~ID 5.

The three inter-group stack ports A1 of the switch 401 are invalid, and the aggregated stack link group G1 of the stack group 41 invalid. In the unicast forwarding table of the switch 401, chip IDs corresponding to the aggregated stack link group G1 of the stack group 21 is null.

The aggregated stack link group G2 of the stack group 41 is respectively on forwarding path from the stack group 41 to the stack group 42 and forwarding path from the stack group 1 to the stack group 43. Therefore, in the unicast forwarding table of the switch 401, chip IDs corresponding to the aggregated stack link group G2 include ID 6~ID 11 and ID 12~ID 17.

Based on the above principle of configuring the unicast forwarding table of the switch 401, the unicast forwarding tables of switches 402~403 may be configured.

According to the same principle of configuring the unicast forwarding tables of the switches in the stack group 41, unicast forwarding tables of switches in stack groups 42~43 may be configured.

The unicast forwarding tables of the switches 401~409 may be configured manually, or be configured automatically by executing a computer program.

A Third Example

Figure 6:
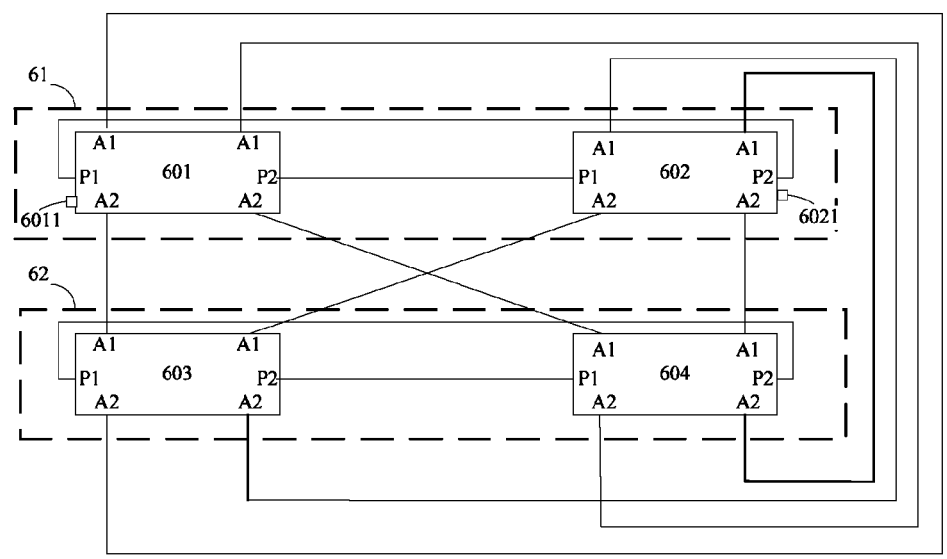
FIG. 6 is a schematic diagram illustrating another stacked switches system based on an example of the present disclosure.

FIG. 6 is a schematic diagram illustrating another stacked switches system based on an example of the present disclosure. The stacked switches system as shown in FIG. 6 includes two stack groups: stack group 61 and stack group 62. Stack group 61 includes switch 601 and switch 602. Stack group 62 includes switch 603 and switch 604. Each switch in the stack groups 61 and 62 is configured with a valid intra-group stack port P1 and a valid intra-group stack port P2.

In stack group 61, the switch 601 and the switch 602 are adjacent switches. The intra-group stack port P1 of the switch 601 is connected with the intra-group stack port P2 of the switch 602 via a stack link. The intra-group stack port P2 of the switch 601 is connected with the intra-group stack port P1 of the switch 601 via a stack link. Thus, the switch 601 and the switch 602 are connected with each to form the stack group 61 with a ring topology. Based on the same mode, the switch 603 and the switch 604 are connected with each other to form the stack group 62 with a ring topology by using stack links.

Stack group 61 and stack group 62 are adjacent stack groups. Two inter-group stack ports A1 of the switch 601 are respectively connected with an inter-group stack port A2 of the switch 603 and an inter-group stack port A2 of the switch 604 via stack links. Two inter-group stack ports A2 of the switch 601 are respectively connected with an inter-group stack port A1 of the switch 603 and an inter-group stack port A1 of the switch 604 via stack links. Two inter-group stack ports A1 of the switch 602 are respectively connected with an inter-group stack port A2 of the switch 603 and an inter-group stack port A1 of the switch 604 via stack links. Two inter-group stack ports A2 of the switch 602 are respectively connected with an inter-group stack port A1 of the switch 603 and an inter-group stack port A1 of the switch 604 via stack links.

When the switches 601-604 in the stacked switches system as shown in FIG. 6 complete topology convergence, the switches 601 and 602 may associate their working inter-group stack ports A1 and inter-group stack ports A2 respectively with a first aggregated stack link group G1 and a second aggregated stack link group G2 of the stack group 61. The switches 603 and 604 may associate their working inter-group stack ports A1 and inter-group stack ports A2 respectively with a first aggregated stack link group G1 and a second aggregated stack link group G2 of the stack group 62.

In an example, each forwarding chip of each switch is associated with an exclusive identification, it is assumed that each switch shown in FIG. 6 is configured with two forwarding chips. In this example, suppose that each forwarding chip of each switch may be associated with a unique identification and each switch in FIG. 6 has two forwarding chips. The member IDs of the switches 601 to 604 are respectively slot 1 to slot 4. The chip IDs associate with the forwarding chips of the switches 601~604 in FIG. 6 are as shown in table 3.

TABLE 3

| Slot ID | Slot 1 | Slot 2 | Slot 3 | Slot 4 |
|---|---|---|---|---|
| Associated ID | 0, 1 | 2, 3 | 4, 5 | 6, 7 |

Figures 7, 8:
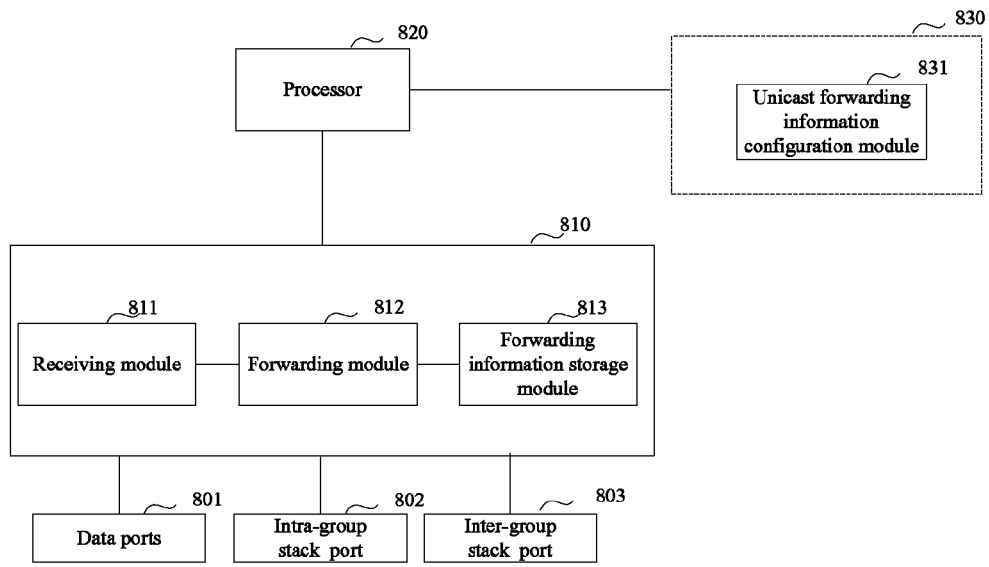
FIG. 7 is a schematic diagram illustrating unicast forwarding information of each switch in the stacked switches system as shown in FIG. 6.
FIG. 8 is a schematic diagram illustrating a structure of a member device based on an example of the present disclosure.

FIG. 7 shows a unicast forwarding table of each switch in the stacked switches system based on an example of the present disclosure. Hereinafter, the unicast packet forwarding procedure in the stacked switches system is described with reference to FIG. 6 and FIG. 7.

The switch 601 may receive a unicast packet via a data port 6011 belonging to VLAN 30. In the received switch 601, the VLAN ID of the unicast packet is VLAN 30, a source MAC address is MAC 6 and a destination MAC address is MAC 7. The data port 6011 is ingress port of the received unicast packet, and the chip which the data port 6011 locates on is ingress chip of the received unicast packet. Port identification 6011 of the data port 6011 is ingress port identification, and chip ID 0 of the ingress chip is ingress chip identification.

The switch 601 may look up a local MAC address table based on the VLAN 30 and the MAC 6, may learn a new MAC address entry based on the VLAN 30, the MAC 6, the chip identification ID 0 and the port identification 6011 of the unicast packet when no matching MAC address entry is found.

The switch 601 may look up the local MAC address table based on VLAN 30 and MAC 7, and find a matching MAC address entry in which the VLAN 30 and the MAC 7 may correspond to chip ID 2 and port identification 6021, i.e., the chip ID 2 is egress chip identification and the port identification 6021 is the egress port identification.

The switch 601 may identify that ID 2 is neither ID 0 nor ID 1 associating with local chips on the switch 601, and find an intra-group stack port P1 by looking up the unicast forwarding table of the switch 601 (shown in the FIG. 7) based on the egress chip identification ID 7. The switch 601 may forward the unicast packet containing the ingress chip identification ID 0, the ingress port identification 6011, the egress chip identification ID 2 and egress port identification 6021 to the switch 602 via the found intra-group stack port P1.

The switch 602 may receive the unicast packet containing the ingress chip identification ID 0, ingress port identification 6011, egress chip identification ID 2 and egress port identification 6021, find a matching MAC address entry by looking up the local MAC address table based on VLAN 30 and MAC 6, and find a matching MAC address entry by looking up the local MAC address table based on VLAN 30 and MAC 7. The switch 602 may identify that the egress chip identification ID 2 may be associated with a local chip on the switch 602, and forward the unicast packet via a data port 6021 corresponding to the egress port identification 6021 by removing the ingress chip identification ID 0, ingress port identification 6011, egress chip identification ID 2 and egress port identification 6021.

The switch 601 is the ingress switch of the unicast packet which ingresses the unicast packet into the stacked switch system, and send the unicast packet via the intra-group stack port on forwarding path towards the switch 602 when the switch 602 is egress switch which is in the same stack group 61.

In the stacked switches system as shown in FIG. 6, two paths from the stack group 61 to the stack group 62 and two paths from the stack group 62 to the stack group 61 have the same number. The paths which on aggregated stack link group G1 of each stack group are selected as forwarding paths between stack groups. The unicast packets which are received by the switch 601 and the switch 602 may be forwarded to the switch 603 or the switch 604 via the aggregated stack link group G1 of the stack group 61. Based on the same mode, the unicast packets which are received by the switch 603 and the switch 604 may be forwarded to the switch 601 or the switch 602 via the aggregated stack link group G1 of the stack group 62.

In each stack group in FIG. 6, two paths from one switch to another switch are the same. The path on the preferable intra-group stack port P1 is selected as the forwarding path. In FIG. 6, the intra-group stack port P1 of each switch is allowed to forward unicast packet. The intra-group stack port P2 of each switch is forbidden for forwarding unicast packet In FIG. 7, each unicast forwarding table records: relationship between chip IDs of other switch in the same stack group and intra-group stack ports on forwarding path towards other switches in the same stack group, and relationship between chip IDs of switches in other stack group and aggregated stack link group on forwarding path towards other stack groups.

The configuration of the unicast forwarding table of the switch 601 is taken as an example. In the unicast forwarding table of the switch 601, the chip IDs correspond to stack port P1 include ID 2~ID 3.

Suppose that a unicast packet received at the switch 601 may associate with egress chip identification ID 2 or ID 3. There are two paths from the switch 601 to the switch 602 in the same stack group 61: one path is the intra-group stack port P1 of the switch 601->the intra-group stack port P2 of the switch 602, and the other path is the intra-group stack port P2 of the switch 601->intra-group stack port P1 of the switch 602. The two paths have the same length, i.e. one hop. The preferable intra-group stack port P1 of the switch 601 is located on the former path. Thus, the former path is selected as the forwarding path from the switch 601 to the switch 602. Therefore, the chip IDs corresponding to the intra-group stack port P1 in the unicast forwarding table of the switch 601 include ID 2~ID 3.

In the unicast forwarding table of the switch 601, there is no chip ID corresponds to the intra-group stack port P2. The intra-group stack port P2 is not on the selected forwarding path from the switch 601 to the switch 602.

In the unicast forwarding table of the switch 601, the chip IDs correspond to the aggregated stack link group G1 of stack group 61 include ID 4~ID 7.

Suppose that a unicast packet received at the switch 601 may associate with one of the egress chip identifications ID 4~ID 7 which are associate with switches of the stack group 62. There are two paths from the stack group 61 to the stack group 62: one path is the aggregated stack link group G1 of the switch 61->the aggregated stack link group G2 of the switch 62, and the other path is the aggregated stack link group G2 of the switch 61->the aggregated stack link group G1 of the stack group 62. The two paths have the same length, i.e. one hop. The preferable aggregated stack link group G1 of stack group 61 is on the former forwarding path, thus the former path is selected as the forwarding path from the stack group 61 to the stack group 62. The chip IDs corresponding to the aggregated stack link group G1 in the unicast forwarding table of the switch 601 include ID 4~ID 7. There is no chip ID corresponding to the aggregated stack link group G2 of stack group 61.

In the stack group 61, the unicast forwarding table of the switch 602 may be configured based on the same principles of configuring the unicast forwarding table of the switch 601. The unicast forwarding table records a relationship between the intra-group stack port P1 of the switch 602 and chip IDs of switch 601, and a relationship between aggregated stack link group G1 of the stack group 61 and chip IDs of switches 603 and 604 in the stack group 62. In the stack group 62, the unicast forwarding tables of the switches 603 and 604 may be configured based on the same principles of configuring the unicast forwarding tables of the switches 601 and 602.

In the above-mentioned several examples of the stacked switches system, several methods of forwarding unicast packets among member devices are illustrated It should be noted that, the unicast packet forwarding method of the present disclosure is not limited to those examples.

For example, in a stacked switches system including a plurality of stack groups, when switches in a same stack group are connected with each other based on the same mode of connecting switches 201-204 in the same stack group with each other, and switches in different stack group are connected with each other based on the same mode of connecting switches 401~409 in different stack groups with each other. Relationships between chip IDs of other switches in the same stack group and intra-group stack ports on forwarding paths towards each of other switches in the same stack group may be configured by the same principles which are used for configuring relationships between chip IDs of other switches in the same stack group and intra-group stack ports on forwarding paths towards each of other switches in the same stack group in the example of FIG. 2 and FIG. 3. And a relationships between chip IDs of switches in other stack groups and aggregated stack link groups on forwarding paths towards each of other stack groups may be configured by the same principles which are used for configuring relationships between chip IDs of switches in other stack groups and aggregated stack link groups on forwarding paths towards each of other stack groups in the example of FIG. 4 and FIG. 5.

For another example, in a stacked switches system, when switches in a same stack group are connected with each other based on the same mode of connecting switches 401-403 in the same stack group with each other, and switches in different stack group are connected with each other based on the same mode of connecting switches 201~216 in different stack groups with each other. Relationships between chip IDs of other switches in the same stack group and intra-group stack ports on forwarding paths towards each of other switches in the same stack group may be configured by the same principles which are used for configuring relationships between chip IDs of other switches in the same stack group and intra-group stack ports on forwarding paths towards each of other switches in the same stack group in the example of FIG. 4 and FIG. 5. Relationships between chip IDs of switches chip IDs of switches in other stack groups and aggregated stack link groups on forwarding paths towards each of other stack groups may be configured by the same principles which are used for configuring relationships between chip IDs of switches in other stack groups and aggregated stack link groups on forwarding paths towards each of other stack groups in the example of FIG. 2 and FIG. 3.

For still another example, in a stacked switches system including a plurality of stack groups, switches in different stack group are connected with each other based on the same mode of connecting switches 401~409 in different stack group with each other, some stack groups may comprise switches connecting with each other in a ring like the switches 201-204 in the same stack group, and some stack groups may comprise switches connecting with each other in a chain like the switches 401-403 in the same stack group. Relationships chip IDs of switches in other stack groups and aggregated stack link groups on forwarding paths towards each of other stack groups may be configured by the same principles which are used for configuring relationships between chip IDs of switches in other stack groups and aggregated stack link groups on forwarding paths towards each of other stack groups in the example of in the example of FIG. 4 and FIG. 5. For switches which are in a same stack group and connect with each other in a ring, Relationships chip IDs of other switches in the same stack group and intra-group stack ports on forwarding paths towards each of other switches in the same stack group may be configured by the same principles which are used for configuring relationships between chip IDs of other switches in the same stack group and intra-group stack ports on forwarding paths towards each of other switches in the same stack group in the example of FIG. 2 and FIG. 3. For switches which are in a same stack group and connected with each other in a chain, Relationships between chip IDs of other switches in the same stack group and intra-group stack ports on forwarding paths towards each of other switches in the same stack group may be configured by the same principles which are used for configuring relationships between chip IDs of other switches in the same stack group and intra-group stack ports on forwarding paths towards each of other switches in the same stack group in the example of FIG. 4 and FIG. 5.

In yet another example, in a stacked switches system includes a plurality of stack groups switches in different stack group are connected with each other based on the same mode of connecting switches 201~216 in different stack groups with each other, some stack groups may comprise switches connecting with each other in a ring like the switches 201-204 in the same stack group, and some stack groups may comprise switches connecting with each other in a chain like the switches 401-403 in the same stack group. Relationships between chip IDs of switches in other stack groups and aggregated stack link groups on forwarding paths towards each of other stack groups may be configured by the same principles which are used for configuring relationships between chip IDs of switches in other stack groups and aggregated stack link groups on forwarding paths towards each of other stack groups in the example of FIG. 2 and FIG. 3. For switches which are in a same stack group and connect with each other in a ring, relationships between chip IDs of other switches in the same stack group and intra-group stack ports on forwarding paths towards each of other switches in the same stack group may be configured by the same principles which are used for configuring relationships between chip IDs of other switches in the same stack group and intra-group stack ports on forwarding paths towards each of other switches in the same stack group in the example of FIG. 2 and FIG. 3. For switches which are in a same stack group and connected with each other in a chain, relationships between chip IDs of other switches in the same stack group and intra-group stack ports on forwarding paths towards each of other switches in the same stack group may be configured by the same principles which are used for configuring relationships between chip IDs of other switches in the same stack group and intra-group stack ports on forwarding paths towards each of other switches in the same stack group in the example of FIG. 4 and FIG. 5.

In the above-mentioned examples of the stacked switches system, when an protocol packet, such as an APR response packet or a NA packet, is ingressed by a switch, the protocol packet is to be forwarded based on the above unicast packet processing.

FIG. 8 is a schematic diagram illustrating a member device in a stacked switches system, according to an example of the present disclosure. The stacked switches system may include at least two stack groups and a plurality of member devices, in which the number of the member devices is greater than the number of the stack groups.

As shown in FIG. 8, the member device includes data ports 801, an intra-group stack port 802, an inter-group stack port 803 which belongs to a aggregated stack link group, a forwarding unit 810, a processor 820 and a storage unit 830 connected with the processor 820. The forwarding unit 810 may include a receiving module 811, a forwarding module 812, and a forwarding information storage module 813. The storage unit 830 includes one or more program modules executable by the processor 820. The one or more program modules in the storage unit 830 include a unicast forwarding information configuration module 831 for configuring unicast forwarding table which is stored in the forwarding information storage module 813.

The forwarding information storage module 813 may further store a MAC address table. In each of MAC address entries in the MAC address table, a MAC address and a VLAN ID may be associated with a device identification and a data port identification. The MAC address entries may be learnt by the forwarding module 812.

The forwarding module 812 may send a first received unicast packet via an inter-group stack port which belongs to an aggregated stack link group on a forwarding path towards a different stack group when the first received unicast packet is to be egressed by another member device in the different stack group. The forwarding module 812 may send a second received unicast packet via an intra-group stack port which on a forwarding path towards another member device in a same stack group when the second received unicast packet which is to be egressed by the another member device in the same stack group; The forwarding module 812 may send a third received unicast packet via one of data ports on the member device which associates with a egress port identification of the third received unicast packet when the third received unicast packet is to be egressed by the member device.

The receiving module 811 may receive unicast packets. The forwarding module 812 may identify the aggregated stack link group by looking up a unicast forwarding information in the unicast forwarding table stored by forwarding information storage module 813 based on an egress device identification of the first received unicast packet, and selecting the inter-group stack port from the identified aggregated stack link group.

The forwarding module 812 may identify the intra-stack port by looking up the unicast forwarding information in the unicast forwarding table stored by forwarding information storage module 813 based on an egress device identification of the second received unicast packet.

The receiving module 811 may receive the first received unicast packet via one of the data ports. The forwarding module 812 may look up the MAC address table in the forwarding information storage module 813 based on an destination MAC address and a VLAN ID of the first received unicast packet, and find the egress device identification of the first unicast packet based on a MAC address entry matching with the destination MAC address and the VLAN ID of the first received unicast packet.

The receiving module 811 may receive the second received unicast packet via one of the data ports. The forwarding module 812 may look up the MAC address table in the forwarding information storage module 813 based on an destination MAC address and a VLAN ID of the second received unicast packet, and find the egress device identification of the second unicast packet based on a MAC address entry matching with the destination MAC address and the VLAN ID of the second received unicast packet.

The receiving module 812 may to receive the third received unicast packet via one of the data ports. The forwarding module 812 may look up the MAC address table in the forwarding information storage module 813 based on an destination MAC address and a VLAN ID of the third received unicast packet, and find the egress port identification of the third received unicast packet based on a MAC address entry matching with the destination MAC address and the VLAN ID of the third received unicast packet.

The forwarding module 812 may learn a MAC address entry based on a source MAC address, a VLAN ID, an identification and an ingress port identification of the first received unicast packet when no MAC entry matches with source MAC address and the VLAN ID of the first received unicast packet. The forwarding module 812 may learn a MAC address entry based on a source MAC address, a VLAN ID, an ingress device identification and an ingress port identification of the second received unicast packet when no MAC entry matches with the source MAC address and the VLAN ID of the second received unicast packet. The forwarding module 812 may learn a MAC address entry based on a source MAC address, a VLAN ID, an ingress device identification and an ingress port identification of the third unicast packet when no MAC entry matches with the source MAC address and the VLAN ID of the third received unicast packet.

In one example, the member device shown in FIG. 8 may include another intra-group port and another inter-group stack port belonging to another aggregated stack link group. When the first received unicast packet, the second received unicast packet and the third unicast packet are ingressed in to the stacked switches system, the receiving module may receive the first received unicast packet, the second received unicast packet and the third unicast packet via another intra-group port or another inter-group stack port.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A method of unicast packet forwarding in a stacked switches system including a plurality of stack groups, comprising:
sending, by a member device of the stacked switches system, a first received unicast packet via an inter-group stack port which belongs to an aggregated stack link group on a forwarding path towards a different stack group when the first received unicast packet is to be egressed by another member device in the different stack group;
sending, by the member device, a second received unicast packet via an intra-group stack port which on a forwarding path towards another member device in a same stack group when the second received unicast packet which is to be egressed by the another member device in a same stack group;
sending, by the member device, a third received unicast packet via a data port of the member device which is associated with an egress port identification of the third received unicast packet when the third received unicast packet is to be egressed by the member device.

2. The method of claim 1, further comprising:
identifying, by the member device, the aggregated stack link group by looking up a unicast forwarding information on the member device based on an egress device identification of the first received unicast packet, and selecting the inter-group stack port from the identified aggregated stack link group.

3. The method of claim 1, further comprising:
identifying, by the member device, the intra-stack port by looking up a unicast forwarding information on the member device based on an egress device identification of the second received unicast packet.

4. The method of claim 1, further comprising:
the egress device identification of the first unicast packet is found based on a MAC address entry matching with a destination MAC address and a VLAN ID of the first received unicast packet when the first received unicast packet is ingressed by the member device.

5. The method of claim 1, further comprising:
the egress device identification of the second unicast packet is found based on a MAC address entry matching with a destination MAC address and a VLAN ID of the second received unicast packet when the second received unicast packet is ingressed by the member device.

6. The method of claim 1, wherein,
the egress port identification of the third received unicast packet is found based on a MAC address entry matching with a destination MAC address and a VLAN ID of the third received unicast packet when the third received unicast packet is ingressed by the member device.

7. The method of claim 1, wherein,
learning, by the member device, a MAC address entry based on a source MAC address, a VLAN ID, an identification and an ingress port identification of the first received unicast packet when no MAC entry matches with source MAC address and the VLAN ID of the first received unicast packet;

learning, by the member device, a MAC address entry based on a source MAC address, a VLAN ID, an ingress device identification and an ingress port identification of the second received unicast packet when no MAC entry matches with the source MAC address and the VLAN ID of the second received unicast packet;

learning, by the member device, a MAC address entry based on a source MAC address, a VLAN ID, an ingress device identification and an ingress port identification of the third unicast packet when no MAC entry matches with the source MAC address and the VLAN ID of the third received unicast packet.

8. A member device in a stacked switches system including a plurality of stack groups, wherein the member device comprises:

a receiver to receive unicast data packets; and a transmitter, to send a first received unicast packet via an inter-group stack port which belongs to an aggregated stack link group on a forwarding path towards a different stack group when the first received unicast packet is to be egressed by another member device in the different stack group; to send a second received unicast packet via an intra-group stack port on a forwarding path towards another member device in a same stack group when the second received unicast packet which is to be egressed by the another member device in the same stack group; and to send a third received unicast packet via a data port on the member device which associates with a egress port identification of the third received unicast packet when the third received unicast packet is to be egressed by the member device.

9. The member device of claim 8, wherein:

the transmitter is further to identify the aggregated stack link group by looking up a unicast forwarding information on the member device based on an egress device identification of the first received unicast packet, and selecting the inter-group stack port from the identified aggregated stack link group.

10. The member device of claim 8, wherein:

the transmitter is further to identify the intra-stack port by looking up a unicast forwarding information on the member device based on an egress device identification of the second received unicast packet.

11. The member device of claim 8, wherein:

the receiver is to receive the first received unicast packet via one of the data ports;

the transmitter is further to find the egress device identification of the first unicast packet based on a MAC address entry matching with a destination MAC address and a VLAN ID of the first received unicast packet.

12. The member device of claim 8, wherein the receiver is further to receive the second received unicast packet via one of the data ports;

the transmitter is further to find the egress device identification of the second unicast packet based on a MAC address entry matching with a destination MAC address and a VLAN ID of the second received unicast packet.

13. The member device of claim 8, wherein, the receiver is further to receive the third received unicast packet via one of the data ports;

the transmitter is further to find the egress port identification of the third received unicast packet based on a MAC address entry matching with a destination MAC address and a VLAN ID of the third received unicast packet.

14. The member device of claim 8, wherein, the transmitter is further to learn a MAC address entry based on a source MAC address, a VLAN ID, an identification and an ingress port identification of the first received unicast packet when no MAC entry matches with source MAC address and the VLAN ID of the first received unicast packet; to learn a MAC address entry based on a source MAC address, a VLAN ID, an ingress device identification and an ingress port identification of the second received unicast packet when no MAC entry matches with the source MAC address and the VLAN ID of the second received unicast packet; and to learning a MAC address entry based on a source MAC address, a VLAN ID, an ingress device identification and an ingress port identification of the third unicast packet when no MAC entry matches with the source MAC address and the VLAN ID of the third received unicast packet.

15. The member device of claim 8, wherein, the receiver is further to receive the first received unicast packet, the second received unicast packet and the third unicast packet via another intra-group port or another inter-group stack port belonging to another aggregated stack link group.

* * * * *